United States Patent [19]
Lewis

[11] Patent Number: 5,990,862
[45] Date of Patent: Nov. 23, 1999

[54] METHOD FOR EFFICIENT INPUT DEVICE SELECTION OF ONSCREEN OBJECTS

[76] Inventor: Stephen H Lewis, 137 College Ave., Poughkeepsie, N.Y. 12603

[21] Appl. No.: 08/710,306

[22] Filed: Sep. 17, 1996

Related U.S. Application Data

[60] Provisional application No. 60/003,897, Sep. 18, 1995.

[51] Int. Cl.[6] .............................. G09G 5/08; G06F 15/00
[52] U.S. Cl. .......................................... 345/145; 345/348
[58] Field of Search ................................... 345/145, 146, 345/157, 159, 163, 339, 340, 347, 352, 348

[56] References Cited

U.S. PATENT DOCUMENTS

| | | | |
|---|---|---|---|
| 4,181,952 | 1/1980 | Casey et al. | 364/515 |
| 4,698,625 | 10/1987 | McCaskill et al. | 345/157 |
| 4,725,829 | 2/1988 | Murphy | 345/157 |
| 4,896,291 | 1/1990 | Gest et al. | 345/146 |
| 4,987,411 | 1/1991 | Ishigami | 340/709 |
| 5,298,890 | 3/1994 | Kanamaru et al. | 345/157 |
| 5,508,717 | 4/1996 | Miller | 345/145 |
| 5,565,887 | 10/1996 | McCambridge et al. | 345/145 |
| 5,565,888 | 10/1996 | Selker | 345/146 |
| 5,596,347 | 1/1997 | Robertson et al. | 345/145 |
| 5,600,779 | 2/1997 | Palmer et al. | 345/340 |
| 5,737,553 | 4/1998 | Bartok | 345/339 |
| 5,745,100 | 4/1998 | Bates et al. | 345/145 |
| 5,757,358 | 5/1998 | Osga | 345/146 |
| 5,786,818 | 7/1998 | Brewer et al. | 345/339 |
| 5,805,165 | 9/1998 | Thorne, III et al. | 345/348 |
| 5,808,601 | 9/1998 | Leah et al. | 345/145 |
| 5,808,604 | 9/1998 | Robin | 345/146 |
| 5,844,557 | 12/1998 | Shively, III | 345/348 |

*Primary Examiner*—Jeffery Brier
*Assistant Examiner*—Paul A. Bell
*Attorney, Agent, or Firm*—Hughes Hubbard & Reed LLP; Ronald Abramson; Peter A. Sullivan

[57] ABSTRACT

The present invention tunes, or focuses, an input device's effective targeting capability to the task at hand in a computer system. If there are only 5 choices selectable by a user on a given active screen area on the computer's display device, the present invention logically constrains the input device's cursor movement is to only those five positions, no matter what pixel-by-pixel movement is actually being generated by the movement of the input device. The currently displayed area and its selectable subcomponents (e.g., radio buttons) at any given moment are determined. A logical map of these selectable items and subcomponents is created for use as a filter for input coordinates received from the input device, with each selectable item mapped to a "region" of the input coordinate field. Upon initiation of the present invention, a start point, in the logical map is determined from for the current location of the input device on screen cursor. A highlight is placed around the onscreen selectable item identified by the start point coordinates according to the map. All input device movements are tracked, and mapped to the logical map of the screen area. If at any time mouse movement causes the cursor to enter the logical region identified in the map with a different selectable item than the one currently highlighted, the highlight is moved to the new selectable item and the old highlight is erased. If the input device indicates the user has selected the highlighted item, the action associated with the item is executed. In this manner, the input device cursor will be constrained to move from one selectable item to the next and never be located in a position where an item may not be selected.

15 Claims, 6 Drawing Sheets

METHOD FOR EFFICIENT INPUT DEVICE SELECTION OF ONSCREEN OBJECTS

CROSS-REFERENCE TO RELATED APPLICATION

This application claims the benefit of U.S. Provisional Application No. 60/003,897, filed Sep. 18, 1995.

FIELD OF INVENTION

This invention generally relates to cursor control in a computer system, and more particularly to control of a cursor or input device onscreen indicia in a graphical user interface environment.

BACKGROUND OF THE INVENTION

A typical Graphical User Interface (GUI) presents a user with many onscreen objects which are used to accept input from a user, such as menus, dialog boxes, list boxes, buttons, icons or windows themselves. In the most simple example of how such a GUI accepts input from a user, the user positions his or her input device cursor, e.g., an arrow, over the object and selects the object through some sort of action, e.g. clicking a button on a mouse. Typically the onscreen object to be selected is represented by a small number of pixels (as compared to the entire screen area). The user must locate the mouse cursor at its current position on the screen, maneuver and focus the cursor on the few pixels which represent the object to be selected, and pick the object using the pick button of the input device. In some cases, especially where the input device is difficult to use, such as a mouse or other pointing device associated with a laptop computer, this task can take a disproportionate amount of effort and concentration.

In most cases, the actual required "effective resolution" of the menu/control item "targets" is low. The actual accuracy needed to hit a target item out of the total field of targets would be well below the accuracy demanded by the pixel-by-pixel mode of the input device and its cursor display. For example, in a typical dialog box there may be only 5 or 10 choices of buttons or text input areas. Each of these selectable choices are represented by an onscreen area of approximately 300 square pixels. However, to select a particular button, the user must position the cursor over this 300 square pixel target from the total screen field of approximately 300,000 square pixels. Thus, the pointing device must be accurate and steady enough to hit a target 1/1000 the size of the field. Yet the 10 choices in the field would ideally require only the ability to hit a target 1/10 the size of the field. Thus the act of picking a menu choice is at least 100 times as difficult as it needs to be.

Accordingly, it is an object of this invention to greatly increase the ease of use of an input device such as mouse or other pointing device in a Graphical User Interface environment.

It is also and object of the present invention to increase the efficiency of such an input device in enabling the selection of an onscreen item such as an icon or a dialog box button.

It is a further object of the present invention to decrease the likelihood of error in selecting an onscreen object.

SUMMARY OF THE INVENTION

The method of the present invention improves the performance of input devices when using a Graphical User Interface (GUI) to make selections from windows, window icons, toolbar icons, dialog boxes, buttons, text input areas and the like. The present invention identifies all selectable items and their subcomponents which appear onscreen (or within a smaller field representing, for example a dialog box). A map of the selectable items appearing in the field of concern is created. The entire field is then divided into regions corresponding to the number (and in one embodiment, the relative size) of the selectable items.

Input coordinates from the input device, e.g., a mouse, are mapped to fall only within the logical regions corresponding to selectable items. Whenever the invention is active, the cursor movement is intelligently remapped to jump directly to the selectable on screen choices and move only among those choices. The input device cursor is never positioned in an area on the screen which cannot be selected, but is caused to "jump" directly from one selectable area to the next. The logical regions defining the selectable items can either be contiguous so that there is no "no man's land" between mapped regions, or there can be "space" between them, so that the cursor must traverse the full "no man's land" before the new item can be selected. But even if the cursor is in a "no man's land", it logically remains within the area of the previous region. In this manner, whenever the user clicks the mouse button, an item will be selected. In one embodiment of the present invention, the regions representing the selectable items are highlighted onscreen as the mouse moves from region to region. Although desirable, it is not necessary to redisplay the mouse cursor within a region if highlighting is used.

DETAILED DESCRIPTION OF THE PREFERRED EMBODIMENTS

Figure 1:
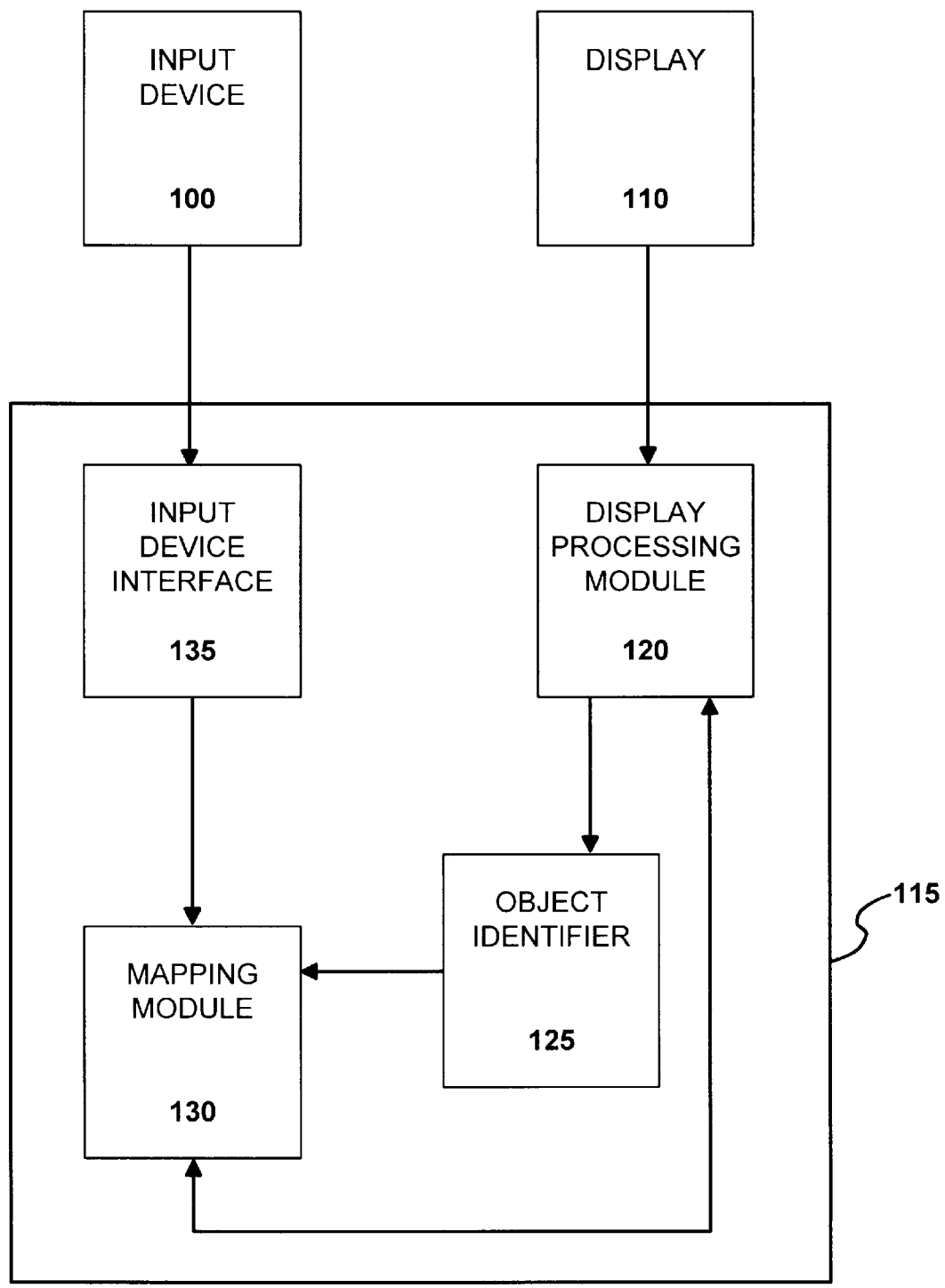
FIG. 1 is a block diagram depicting the elements of the present invention as used in a specially programmed general purpose computer or a special purpose computer.

FIG. 1 depicts a block diagram of the modules of the present invention as incorporated into either a specially programmed general purpose computer 115 or a special purpose computer. Such a computer 115 employs a Graphical User Interface (GUI) which is used on Display 110. The screen of Display 110 is composed of several thousand pixels. A typical screen measures 480 by 640 pixels. Numerous items which can be selected by the user are typically depicted by the GUI on Display 110. Such items include windows, icons, dialog boxes, list boxes, buttons, text entry boxes and similar selectable objects. These items are supplied to Display 110 by Display Processing Module 120 contained in computer 115. Each of the items is typically rectangular in shape and is therefore defined by four sets of x-y screen coordinates. The Object Identifier Module 125 of the present invention retrieves the x-y screen coordinates of each object on Display 110 which can be selected by the user. These screen coordinates are passed onto Mapping Module 130. As will be described more fully below, Mapping Module 130 takes the screen coordinates of the selectable items and logically maps them to corresponding, but larger regions within the entire field of interest. Mapping Module 130 also serves to map the input device cursor for logically determining the position of the cursor with the field and alternatively for displaying on Display 110 by Display Processing Module 120.

Connected to the computer 115 is an Input Device 100 such as a mouse, a trackball, a joystick or another commonly used pointing device. Input Device 100 generates encoded signals which represent the device's movement in both the x and y directions. These x and y movement signals from Input Device 100 are transmitted to Input Device Interface 135 within computer 115. The function of Input Device Interface 135 is to translate the x and y signals from Device 100 into units which are used to move the onscreen input device indicia, such as an arrow. For example, Input Device Interface 135 would translate a movement of ⅛ of an inch by Input Device 100 into a certain number of pixels on the screen, e.g., 5 pixels. The output of Input Device Interface 135 is typically a pair of numbers representing the number of pixels required to effectuate the movement of Input Device 100, in each of the x and y directions. These pixel values are supplied to Mapping Module 130 for use in determining how to logically move and optionally redisplay this cursor.

Figure 2A:
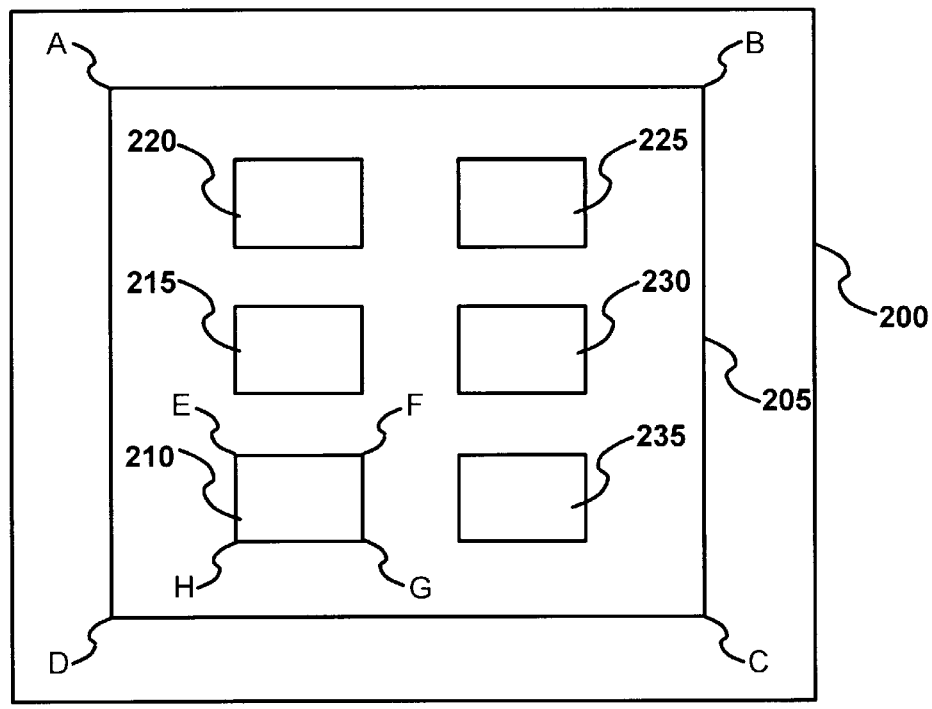
FIG. 2A depicts a screen as displayed by a Graphical User Interface of a computer system.
Figure 2B:
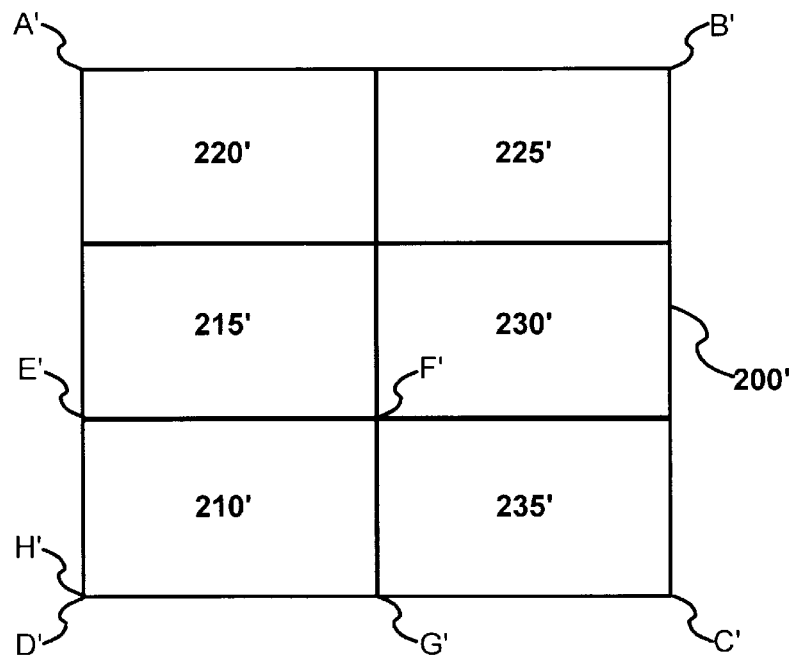
FIG. 2B illustrates the logical map created by the present invention to correspond to the screen depicted in FIG. 2A.
Figure 3A:
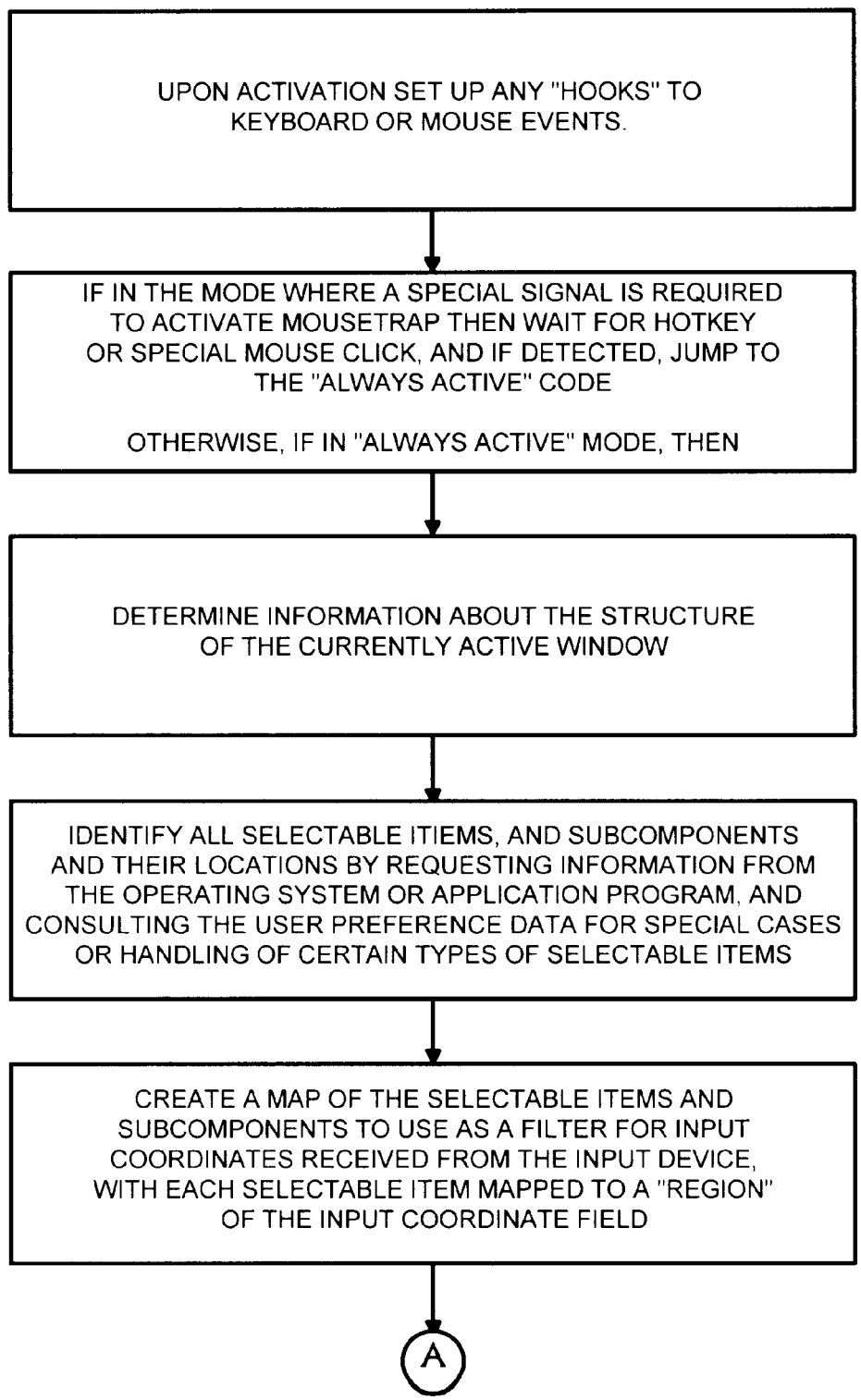
FIG. 3A, 3B and 3C collectively depicts a flow chart illustrating the method of the present invention.
Figure 3B:
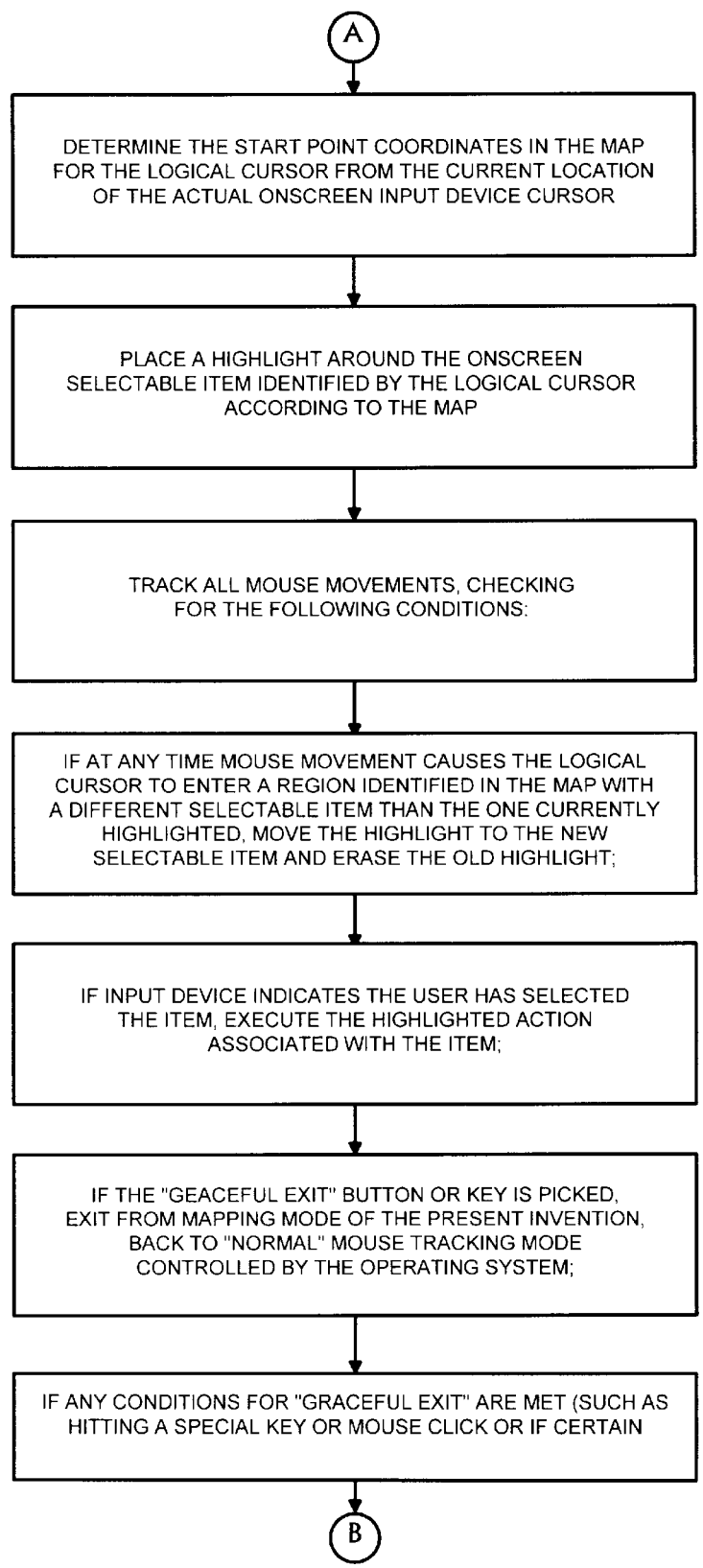
Figure 3C:
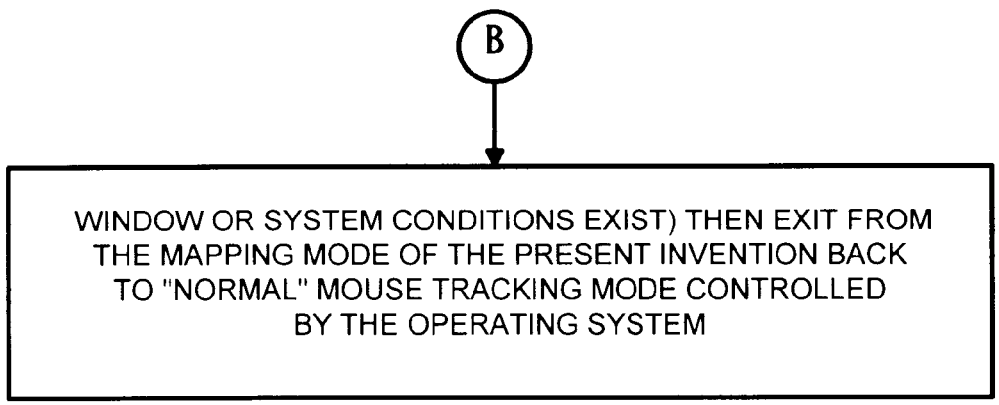

A fuller understanding of the present invention will be had with reference to the screen 200 depicted in FIG. 2A, the logical map 200' depicted in FIG. 2B and the flowchart of FIG. 3. FIG. 2A illustrates a screen 200 displayed on Display 110. Depicted on screen 200 is a dialog box 205 which in turn contains six selectable buttons 210–235. In this Figure and the following discussion, screen coordinates have been assigned to each of these items. For example, dialog box 205 has true screen coordinates A (180, 360), B (460, 360), C (460, 150), and D (180, 150). Button 210 has true screen coordinates E (220, 220), F (240, 220), G (240, 200), and H (220, 200).

Once dialog box 205 has been established, Object Identifier Module 125 of the present invention (FIG. 1) retrieves all of the screen coordinates of dialog box 205 and its associated buttons 210–235. These coordinates are passed onto Mapping Module 130 (FIG. 1) which creates the logical map 200' in memory. Since there are six selectable areas 210–235 in box 205, Mapping Module 130 divides the logical map 200' into six separate regions 210'–235'. These logical regions 210'–235' correspond to the true buttons 210–235 on dialog box 205. Although each of the regions 210'–235' are depicted in this example as being the same size and are butted up against one another, in practice, these areas can be of different size and contain spaces or "no man's land" in between each region.

The points A'–D' on map 200' have the same coordinates as the true points A–D on dialog box 205. The important difference contributed by map 200' is that each of the buttons 210–235 on dialog box 205 are now represented by significantly larger areas 210'–235'. For example, button 210 on dialog box 205 previously occupied approximately 400 square pixels of screen space. In the mapped logical screen space, button 210' now occupies some 9,800 square pixels of logical screen space with coordinates of E' (180, 220), F' (320, 220), G' (320, 150), and H' (180, 150). So instead of being represented by a 20×20 square of pixels, button 210' is now represented by a rectangle of 140 by 70 pixels on each side.

Figure 4:
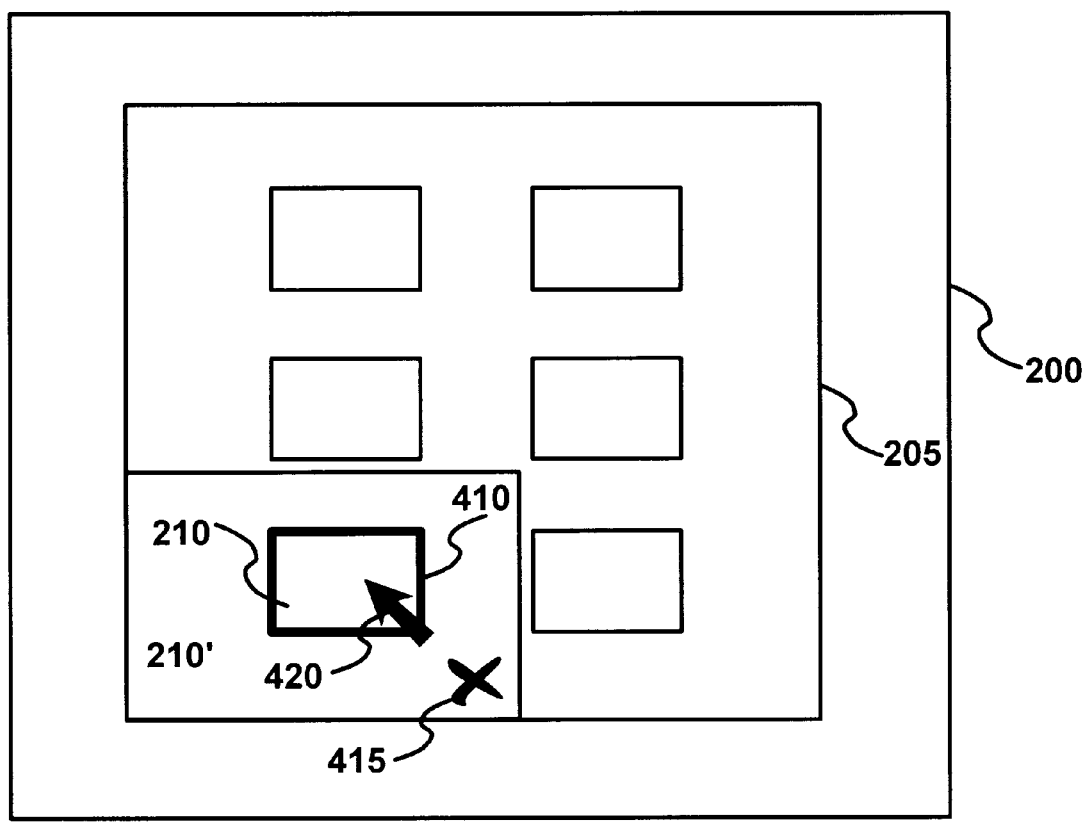
FIG. 4 depicts the highlighting feature of the preferred embodiment, and an optional cursor display feature.

Once the logical map 200' has been created, the present invention logically positions the input device cursor (not shown on these Figures) in the region 210'–235' which was closest to position of the actual input device cursor when dialog box 205 was created. The actual onscreen input device cursor (e.g., an arrow) can either remain where it is was positioned on the screen prior to the present invention's logical mapping, or it can be moved to the screen position corresponding to the logical region 210'–235' where the logical cursor is now positioned, the start coordinates. As a third alternative, the screen cursor can be hidden and the user can rely solely on the highlighting of items to track the logical cursor location. In either of these cases as shown in FIG. 4, it is the preferred embodiment of the present invention to highlight the on-screen button 210–235 corresponding to the logical region 210'–235' into which the cursor was logically mapped. For example, if the input device cursor 415 was in the lowermost, leftmost portion of screen 200, the cursor would be logically mapped into region 210' and the area surrounding button 210 on screen 200 would be highlighted 410 to indicate that the cursor is logically over this area. As stated above, the actual on screen cursor 420 can be moved to this area surrounding button 210 in order to reinforce the visual indication that the cursor is ready to select this button 210.

As Input Device 100 (FIG. 1) is moved by the user to make choices among the onscreen selectable items 210–235, the output of Input Device 100 is monitored through Input Interface 135 (FIG. 1). As the input device, e.g., mouse, indicates relative movement of the mouse, Mapping Module 130 (FIG. 1) will map these relative movements to within the boundary defined by the points A'–D' on map 200'. As the mouse cursor moves within this defined area A'–B'–C'–D', it will cross the boundary of regions 210'–235'. When the mouse cursor crosses one of these logical boundaries, the mouse cursor will "snap" into the next logical region 210'–235', and that region will be highlighted, indicating that it will be executed if the user picks with the input device at that point in time. In this manner, the mouse cursor will always be in a selectable area.

Each possible input coordinate is mapped into one of the regions (or into the "no man's land" between them if logical map 200' is so designed), so that when the input device cursor enters a new mapped region, the displayed highlight will be moved from the previous selectable item to one corresponding with the new input coordinates. The present invention determines the selectable item locations for any particular application program and creates map 200' of the selectable choices on the fly, thus working from outside any application program, program shell or operating system's GUI in order to improve its performance. The special highlighting rectangle 410 is placed around the current selectable choice in dialog boxes to improve visibility.

User preferences for the operation of the present invention can include choosing which hotkey or mouse click acts as a "initiator" to engage the mapping mode, choosing whether the mapping mode is "on" all the time or only when initiated by a special keystroke or mouse action and, choosing the scope of the mapping mode within any window which has selectable choices.

Some types of selectable items (targets) or situations may be better suited than others to the kind of input mode afforded by the present invention. As a further enhancement, a filtering mechanism allows the user to choose the type of targets which will be automatically sensed by the present invention, allowing the constraint mechanism to affect some, but not all targeting situations and targeting objects. A system using the present invention may thus be programmed to "skip over" certain types of targets, or to revert to pixel-by-pixel mode when the cursor has entered the region of certain types of targets or window elements.

The present invention's mapping system does not completely replace the standard pixel-by-pixel mode of the input device, but allows a user to "accelerate" or instantly switch between modes, or to engage the desired mode if the task calls for one or the other, or even program the system to automatically engage mapped mode in certain situations and default to the standard mouse mode in others. The present invention improves the operation of any input device without requiring any physical changes in the input device or its associated software itself. The present invention draws on the natural configuration of the input device and overlays new modes of operation on any existing device. The present invention can be an independent program which a user loads, or it can be built into an application program or the operating system itself. The user can choose to have the mapping mode of the present invention operating as a default mouse mode, or can engage the present invention with a special signal not used for other purposes, for example, clicking the right button on the mouse or holding down the shift key.

The embodiments described above clearly realize the stated objects of the invention, yet are not intended as an exhaustive compilation of the invention's patentable novelty. Numerous further variants will be obvious and may be effected by anyone skilled in the art without departing from the scope or spirit of the invention.

I claim:

1. A method for input selection of objects within an area of a display screen by means of an input device having coordinates within such area, comprising:

identifying selectable items within said area;

creating a map of said selectable items;

establishing within said area one or more non-overlapping regions, each such region containing a selectable item and being substantially larger in area than such selectable item and all of said regions together in the aggregate occupying a substantial portion of said area;

monitoring the coordinates of said input device;

determining whenever said coordinates have moved into one of said regions; and whenever it is so determined that said coordinates have moved into one of said regions, remapping said coordinates to new coordinates within the perimeter of the selectable item.

2. The method of claim 1 further comprising the additional step of highlighting the selectable area associated with the region that the input device coordinates have moved into, and unhighlighting the selectable area associated with the region that said coordinates have moved out of.

3. A machine readable storage medium on which has been recorded a computer program implementing the method of claim 2.

4. The method of claim 1 wherein a cursor is displayed at the on-screen position of said new coordinates.

5. A machine readable storage medium on which has been recorded a computer program implementing the method of claim 4.

6. The method of claim 1 wherein said non-overlapping regions completely occupy the entire area of said display.

7. The method of claim 1 wherein there exists at least some portion of said area that is not within one of said regions.

8. The method of claim 1 wherein the regions correspond with the selectable items in accordance with a relation in which fewer than all of the selectable items are assigned to regions.

9. The method of claim 8 wherein selectable items which are not assigned to regions are rendered non-selectable.

10. The method of claim 8 wherein selectable items which are not assigned to said regions are left as being selectable when the coordinates of said input device are directly within the perimeter of such selectable item.

11. The method of claim 1 wherein the entire capability provided by the claimed method can be activated or deactivated.

12. A machine readable storage medium on which has been recorded a computer program implementing the method of claim 1.

13. An interactive electronic apparatus, in which input selection may be made of objects within an area of the display thereof, comprising, a general purpose digital computer;

a display screen;

an input device;

means for identifying selectable items within an area of said display screen;

means for creating a map of said selectable items;

means for establishing within said area one or more non-overlapping regions, each such region containing a selectable item and being substantially larger in area than such selectable item, and all of said regions together in the aggregate occupying a substantial portion of said area corresponding to said selectable items;

means for monitoring the coordinates of said input device;

means for determining whenever said coordinates have moved into one of said regions; and means for remapping said coordinates to new coordinates within the perimeter of the selectable item whenever it is so determined that said coordinates have moved into one of said regions.

14. An interactive electronic apparatus in accordance with claim 13 further comprising means for displaying a cursor at the on-screen position of said new coordinates.

15. An interactive electronic apparatus in accordance with claim 13 further comprising additional means for highlighting the selectable area associated with the region that the input device coordinates have moved into, and unhighlighting the selectable area associated with the region that said coordinates have moved out of.

* * * * *